Figure 1:
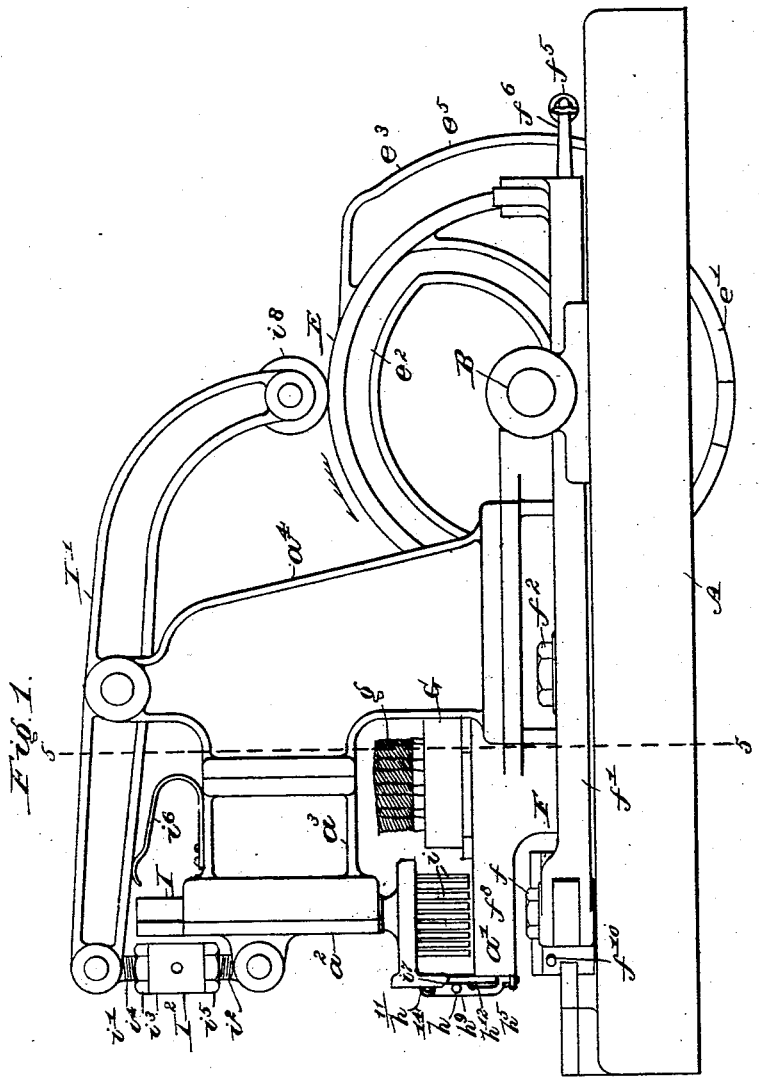

(No Model.) 5 Sheets—Sheet 1.
E. H. WRIGHT & J. H. CARMICHAEL.
NAIL SETTING MACHINE.

No. 564,815. Patented July 28, 1896.

WITNESSES.
Kirkley Hyde.
Agnes Barley.

INVENTORS.
Eugene H. Wright +
James H. Carmichael,
By Albert M. Moore,
their ATTORNEY.

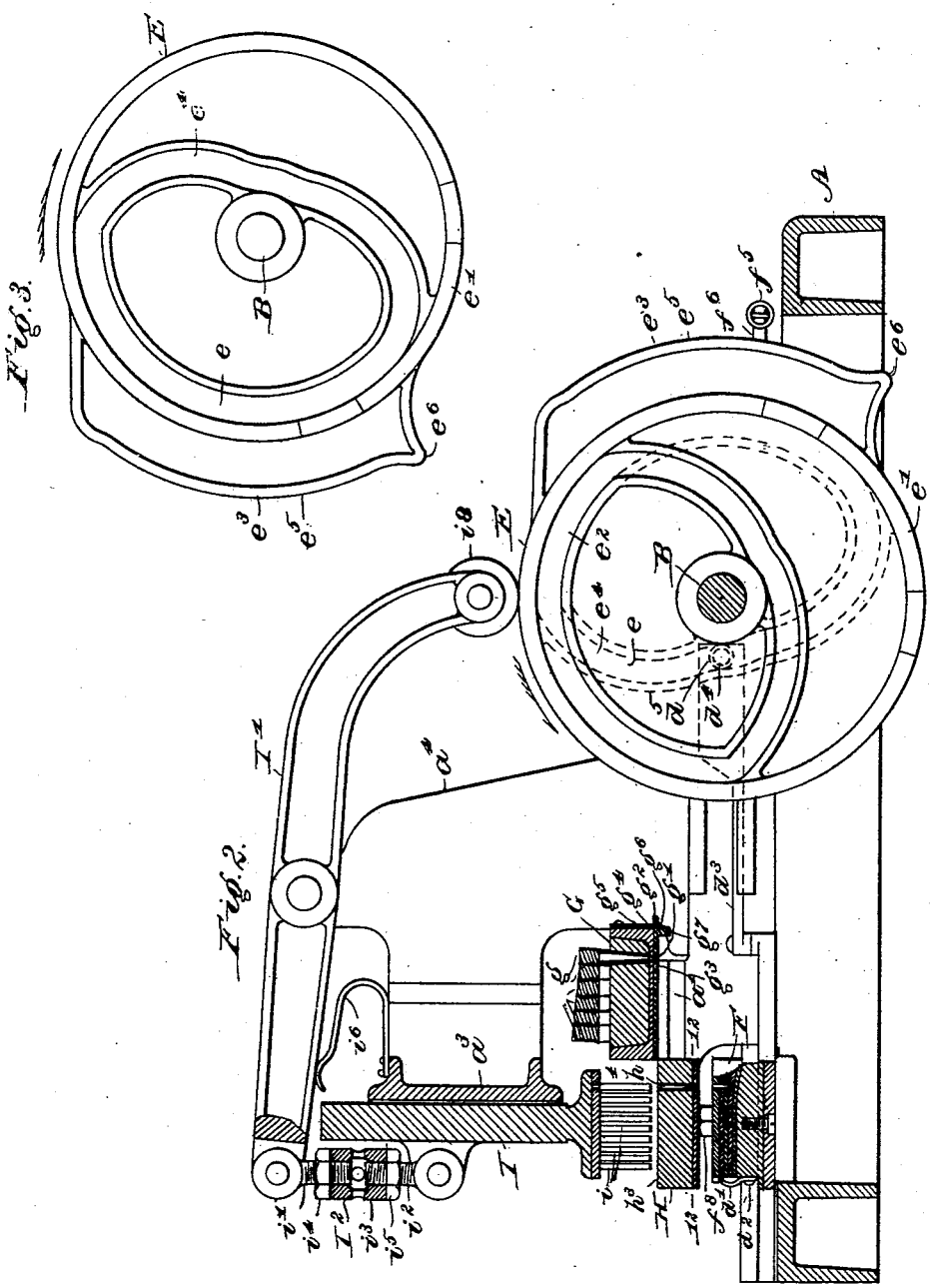

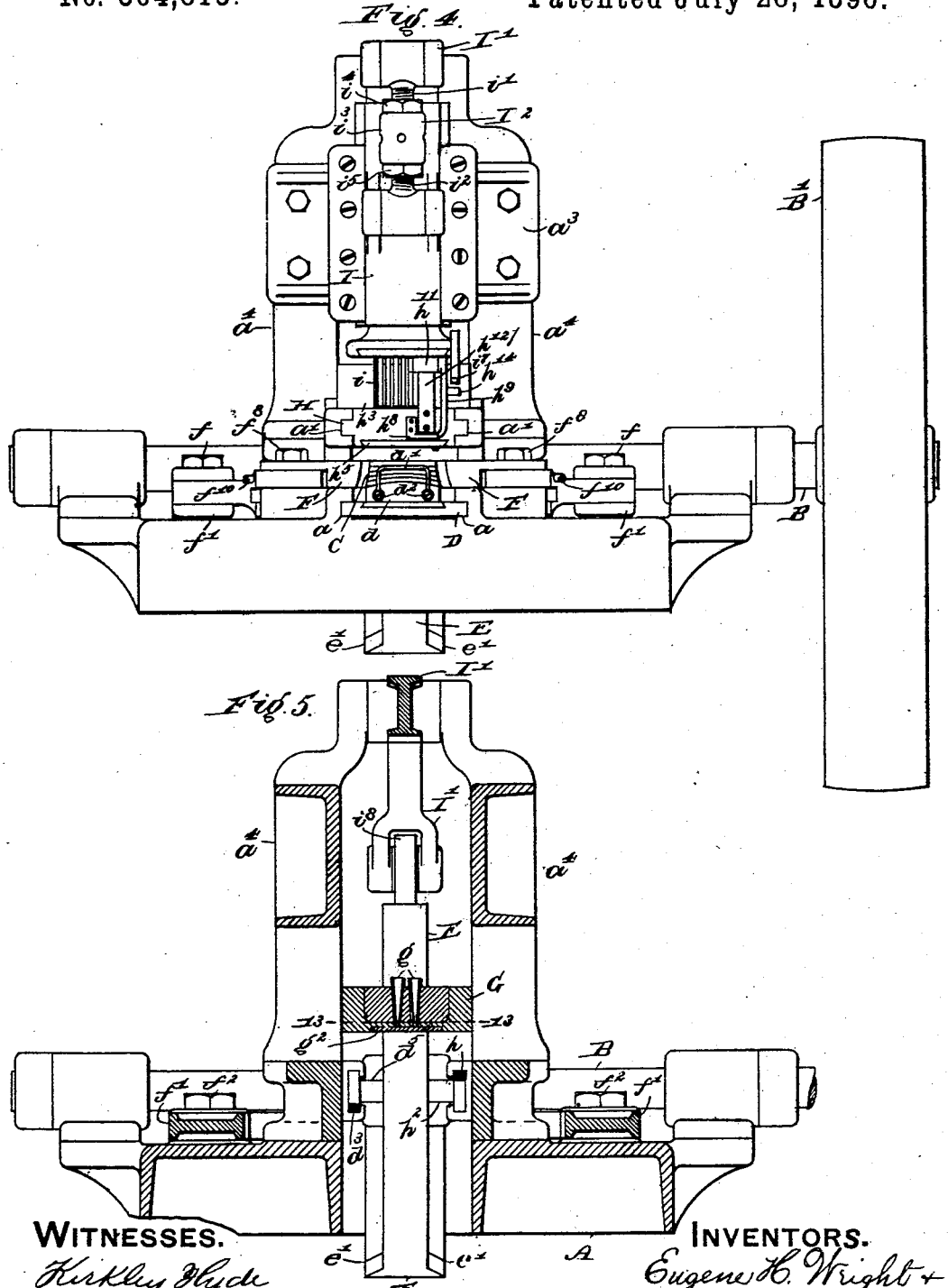

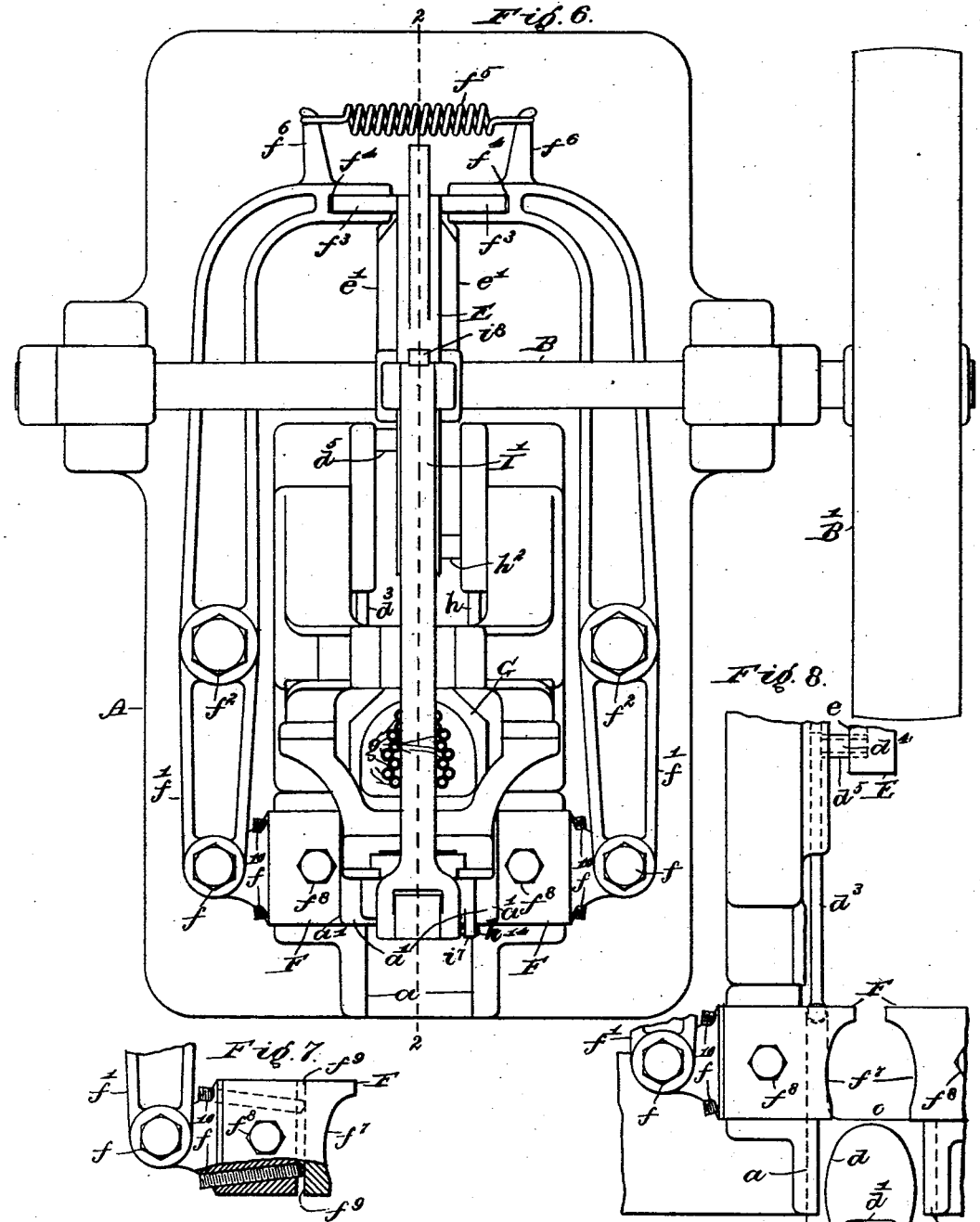

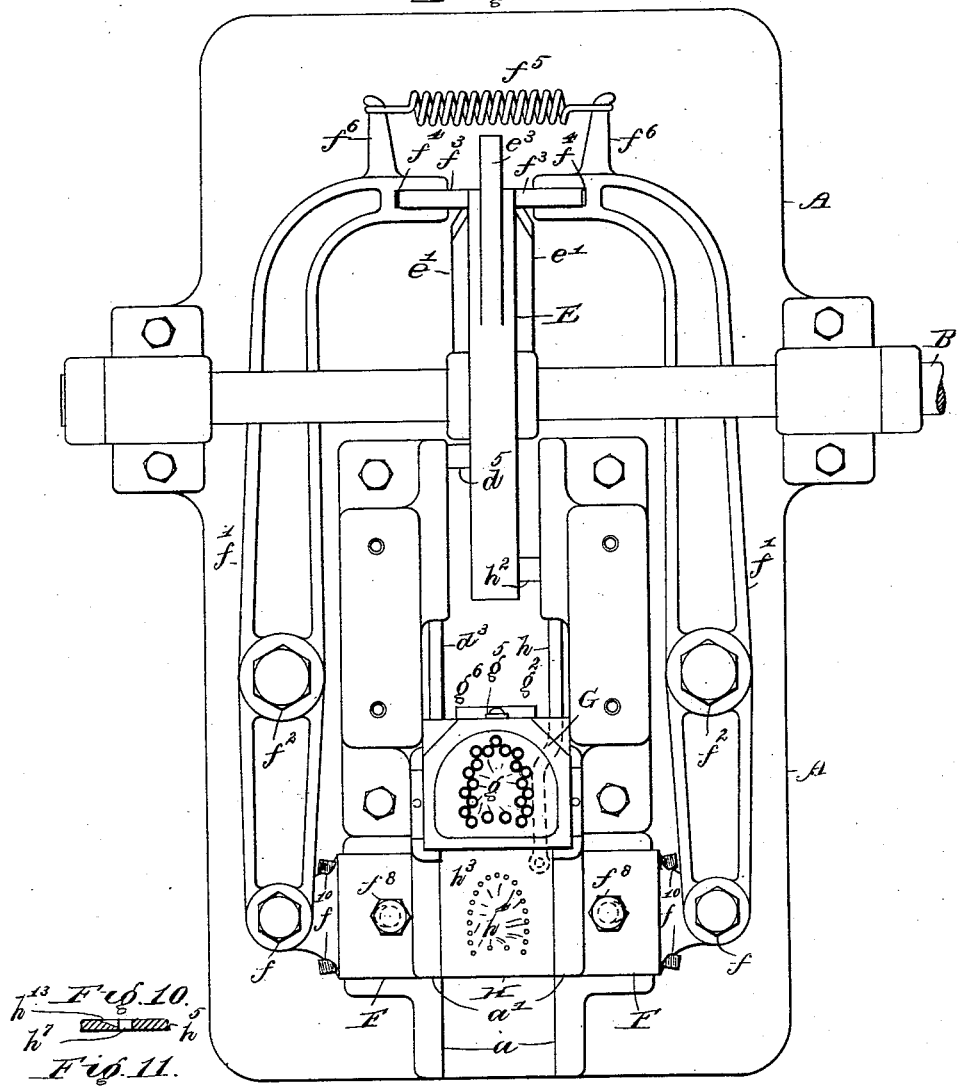

UNITED STATES PATENT OFFICE.

EUGENE H. WRIGHT, OF LOWELL, AND JAMES H. CARMICHAEL, OF LAWRENCE, MASSACHUSETTS; SAID CARMICHAEL ASSIGNOR TO SAID WRIGHT.

NAIL-SETTING MACHINE.

SPECIFICATION forming part of Letters Patent No. 564,815, dated July 28, 1896.

Application filed August 3, 1894. Serial No. 519,355. (No model.)

*To all whom it may concern:*

Be it known that we, EUGENE H. WRIGHT, residing at Lowell, in the county of Middlesex, and JAMES H. CARMICHAEL, residing at Lawrence, in the county of Essex, Commonwealth of Massachusetts, citizens of the United States, have invented a certain new and useful Improvement in Nail-Setting Machines, of which the following is a specification.

Our invention relates to nail-setting machines, and comprises means for centering the nails with the holes of the pricked heel; means for centering the heels in the heel-holder with the holes in the heels in line with the holes in the nail-holder; means for holding the nails in the "skimmer" or nail-holder until the proper time for discharging them into the heel, and means for opening and for holding open the skimmer while the nails are being driven; and it consists in the devices and combinations hereinafter described and claimed.

In the accompanying drawings, on five sheets, Figure 1 is a right side elevation of a nail-setting machine provided with our improvement, omitting the driving-pulley; Fig. 2, a vertical longitudinal central section of the same on the line 2 2 in Fig. 6, showing the nail-driver lever and cam-wheel in right side elevation; Fig. 3, a left side elevation of said cam-wheel; Fig. 4, a front elevation of said machine; Fig. 5, a vertical transverse section on the line 5 5 in Fig. 1; Fig. 6, a plan of said machine; Fig. 7, a plan of the left heel-clamping jaw and the adjacent part of the corresponding clamping-lever, a part of said jaw being broken away to show the jaw-adjusting screws; Fig. 8, a plan of said left clamping-jaw and the adjacent part of its operating-lever, a part of the right clamping-jaw and the heel-receiving slide; Fig. 9, a plan of the machine, omitting the nail-driver and its lever and supporting-stands and driving-pulley; Fig. 10, a vertical longitudinal section of a part of the centering-valve; Fig. 11, an enlarged plan of a part of the same; Fig. 12, a horizontal section, on the line 12 12 in Fig. 2, of the skimmer, showing the centering-valve plate in plan; Fig. 13, a horizontal section, on the line 13 13 in Fig. 5, of the head-block, showing cut-off valve indicated partly in plan by dotted lines.

The bed A supports the working parts of the machine, all of which are driven by the shaft B, said shaft being constantly and uniformly rotated by means of a belt (not shown) from any suitable motor running on the pulley B', fast on said shaft.

The heel-blank C, consisting of lifts fastened to each other by brads in the usual manner, is placed by hand, bottom up, on an anvil-block $d$, Figs. 1, 2, and 4, secured on the heel-slide D, said anvil-block having its upper surface convex to fit the concave top of the heel-blank, and the breast of the heel-blank being drawn by the fingers against the back of a stop $d'$, secured to the front of said anvil-block $d$, as shown in Figs. 2 and 4, where said stop is represented as a wire bent in the form of an inverted U and held by screws $d^2$.

The slide D runs in suitable horizontal ways $a$ in the bed of the machine and is given a reciprocating motion by the cam-groove $e$ (shown in dotted lines in Fig. 2) in the left side of the cam-wheel E, fast on the shaft B, and by a connecting-rod $d^3$ or backward extension of said slide, which rod or extension carries at its rear end a laterally-projecting stud $d^4$, which may carry an antifriction-roll $d^5$ within said cam-groove $e$. As soon as the heel-slide reaches the rear limit of its movement the curved edge of the heel-blank is grasped by the jaws F F, pivoted at $f f$ on the clamping-levers $f' f'$, said levers turning on vertical fulcrum-studs $f^2 f^2$, supported on the bed A, the rear ends of said levers being forced, Figs. 6 and 9, outward by cams $e' e'$ on the cam-wheel E coming in contact with said rear ends or with antifriction-rolls $f^3 f^3$, pivoted in slots $f^4 f^4$, with which said rear ends are provided, said rear ends being normally drawn toward each other to open said jaws F F by the contraction of a spiral spring $f^5$, which connects projections $f^6 f^6$ on said rear ends, respectively. The inner faces of the grasping parts $f^7 f^7$ of the jaws F F are curved to fit the curved edges of the heel-blank, and are pivoted at $f^8 f^8$ on the bodies of said jaws and are each provided with a shoulder $f^9\,f^9$, against which, on opposite sides of the pivot $f^8$, thrust adjusting-screws $f^{10}\,f^{10}$, so that by loosening one screw $f^{10}\,f^{10}$ of a pair and tightening the other the curved inner face of the corresponding jaw parts $f^7$ may be brought into parallelism with the curved edge of the heel-blank.

The nails are fed to the machine herein described by any suitable device, as by the machine shown in the patent to Farnsworth, No. 198,590, dated December 25, 1877, the head-block or guide-block of which feeding-machine is indicated at G and the flexible conductors of the same at $g$, Figs. 1, 2, 6, and 9, the block G having as many perforations $g'$ as there are nails to be driven into a single heel, and there being a flexible conductor for each perforation $g'$, and said block and conductors being stationary. A slide or valve $g^2$ has as many holes $g^3$ as there are perforations or holes $g'$ in the block G and similarly arranged, and said valve slides in suitable ways $g^4$ on the under side of said block, so that when said valve is properly placed there is a direct passage for nails through said block and valve; but the holes $g^3$ in the valve are normally held out of concentricity with the holes $g'$ by means of a leaf-spring $g^5$, Fig. 2, secured to the back of the block G and extending down through a hole $g^6$, Fig. 13, in said valve and pressing the holes $g^3$ in front of the holes $g'$.

A nail-feed slide H is guided in horizontal ways $a'$ and operated similarly to the heel-slide D, said slide H having an extension or connecting rod $h$, carrying a stud $h'$, and an antifriction-roll $h^2$, which enters the cam-groove $e^2$ on the opposite side of the cam-wheel E from the cam-groove, whereby said slide H is given a reciprocating movement by the rotation of said cam-wheel. A skimmer or nail-holder $h^3$ is carried by the slide H and is a block provided with vertical holes $h^4$, precisely like the perforations $g'$ in number, size, and arrangement, and when the slide H is at the limit of its backward movement the holes $h^4$ are each in the same vertical line with one of the holes $g'$, and said skimmer or nail-holder just previous to the completion of its backward movement strikes a projection $g^7$ on the under side of the valve $g^2$ and brings the corresponding holes $g'$, $g^3$, and $h^4$ in line with each other and allows the nails in the guide-block G to fall through into the skimmer $h^3$.

The nails are prevented from going entirely through the skimmer by a valve $h^5$, Figs. 1, 2, 4, 10, 11, and 12, similar to the valve $g^2$ and sliding in ways $h^6$ on the under side of the skimmer, Fig. 4, and having the same number and arrangement of holes $h^7$ as said skimmer, but normally held out of line with the holes in said skimmer by a spring $h^8$, secured to the front of said skimmer and pressing against a lever $h^9$, the lower end of which passes through a hole $h^{10}$ in said valve $h^5$ and the upper end of which is pivoted at $h^{11}$ on a vertical stud $h^{12}$ on the skimmer. Backwardly-inclined guide-grooves $h^{13}$, Figs. 10 to 12, extend parallel with each other and with the direction in which the skimmer and valve move from points slightly in front of the holes $h^7$ radially into said holes $h^7$, these grooves being V-shaped in cross-section or having downwardly-converging sides to receive the points of the nails as the same are discharged from the block G into the skimmer and to guide the points of the nails into the centers of said holes $h^7$ and into the centers of the holes pricked, in the ordinary manner, in the heel-blanks, when the centering-valve $h^5$ is brought forward, as hereinafter described, the holes in the heel-blank being, as usual, smaller than the holes in the valve and the object of the guide-grooves being to prevent the points of the nails from resting on the heel-blanks instead of entering the holes in said blanks, for unless the nails enter said holes said nails cannot be driven straight and parallel with each other.

When the loaded skimmer $h^5$ is above the heel-blank, it is immediately below the vertical slide I, Figs. 1, 2, and 6, which carries a series of vertical nail-drivers $i$, such in number and arrangement that on the descent of said slide I each nail-driver $i$ enters a corresponding hole $h^4$ in said skimmer, driving the nails through the skimmer into the heel-blank, the valve $h^5$ being opened by a beveled down-hanging projection $i^7$, striking a stud $h^{14}$, which projects laterally from the lever $h^9$, above described, and forces the lower end of said lever $h^9$ and the valve $h^5$ forward until the holes $h^7$ in said valve are continuous with the holes $h^4$ in the skimmer.

The nail-driver slide I is guided in ways $a^2$ on a bracket $a^3$, said bracket being supported on stands $a^4$, bolted to the bed A, and said slide is given a vertical reciprocating movement by the action of the cam $e^3$, formed on the periphery of the cam-wheel E, on the lever I′, said lever I′ being pivoted between said stands $a^4$ and having an antifriction-roll $i^8$ at its rear end, which rests upon said cam $e^3$, and said lever I′ being connected to said slide I by an adjustable link I², consisting of two screws $i'\,i^2$, one of which has a right-hand and the other a left-hand thread, and a nut $i^3$ or internally-threaded sleeve which engages both of said screws $i'\,i^2$, one of said screws, $i'$, being pivoted on said lever I′ and the other being pivoted on said slide I. By turning the nut $i^3$ the higher and lower limit of movement of the nail-drivers may be varied, and after the proper adjustment is secured said nut $i^3$ may be prevented from being jarred or accidentally moved by check-nuts $i^4\,i^5$, turning on the screws $i'\,i^2$, respectively, against said nut $i^3$.

The rear end of the lever I′ is held in contact with the cam $e^3$ by the weight of the rear arm of said lever I′, or preferably by a spring (represented as a C-spring $i^6$, Fig. 1) compressed between the front arm of said lever and the bracket $a^3$.

After the nails are driven to the proper distance the anvil-block is carried forward from under the heel-blank by the action of the part $e^4$ of the cam $e$, said part having an increasing radius, the pressure of the nail-drivers is slightly diminished owing to the slightly-decreasing radius of the part $e^5$ of the cam $e^3$, the jaws are released from the action of the cam $e'$, and immediately afterward a further sudden depression of the nail-driver, caused by the suddenly-increasing radius of the cam $e^3$ at $e^6$, forces the loaded heel-blank down out of the machine into any suitable receptacle or on the floor.

We claim as our invention—

1. The combination of a perforated nail-holder or skimmer, a valve, sliding on the bottom of said skimmer and having holes equal in number and arrangement to the perforations of said skimmer, a lever, provided with a laterally-projecting stud and pivoted on said skimmer and engaging said valve, a spring, pressing said lever to keep said valve closed, and a slide, carrying nail-drivers and having a projection adapted to strike said lever and move said valve to bring its holes in line with the perforations of said skimmer, as and for the purpose specified.

2. The combination of a perforated nail-holder or skimmer, a valve, sliding in suitable ways with which the bottom of said skimmer is provided, and having holes, equal in number and arrangement to the perforations of said skimmer, and having a slot, a lever, pivoted on said skimmer and entering said slot and having a projection, a spring, pressing said lever, to keep the holes in said valve out of line with the perforations of said skimmer, and a vertically-reciprocating slide, carrying nail-drivers and having a projection adapted to strike said lever to move said valve and bring its holes into line with the perforations of said skimmer, as and for the purpose specified.

3. The combination of the nail-holder or skimmer, having a series of nail-perforations, and a valve, having an equal number of holes similarly arranged, and a spring acting upon said valve to hold said holes out of line with said nail-perforations in said skimmer, said valve having also in its upper surface guide-grooves to receive the points of nails passing through said skimmer to conduct said points into said holes and to center said points with said holes when said holes are brought into line with said nail-perforations, as and for the purpose specified.

4. The combination of the nail-holder or skimmer, having a series of nail-perforations, and a valve, having an equal number of holes similarly arranged, and a spring acting upon said valve to hold said holes out of line with said nail-perforations in said skimmer, said valve having also guide-grooves, provided with sides downwardly inclined toward each other and leading into the holes in said valve, to receive the points of nails passing through said skimmer to conduct said points into said holes and to center said points with said holes when said holes are brought into line with said nail-perforations, as and for the purpose specified.

5. The combination of levers, jaw-bodies jointed thereto, clamping parts, pivoted on said jaw-bodies and having curved faces to grasp the curved edges of a heel, and adjusting-screws, turning in each of said jaw-bodies on opposite sides of the pivot of the corresponding clamping part against shoulders, with which said clamping part is provided, to bring said curved faces into parallelism with the curved edges of said heel, as and for the purpose specified.

In witness whereof we have signed this specification, in the presence of two attesting witnesses, this 31st day of July, A. D. 1894.

EUGENE H. WRIGHT.
JAMES H. CARMICHAEL.

Witnesses:
ALBERT M. MOORE,
AMELIA W. REFFELT.